March 5, 1935.  E. A. SPERRY, JR., ET AL  1,992,970
HYDROPNEUMATIC AUTOMATIC PILOT
Filed Sept. 2, 1932  7 Sheets-Sheet 1

INVENTORS:
ELMER A. SPERRY JR.
BERT G. CARLSON
MORTIMER F. BATES.

BY Herbert H. Thompson
ATTORNEY.

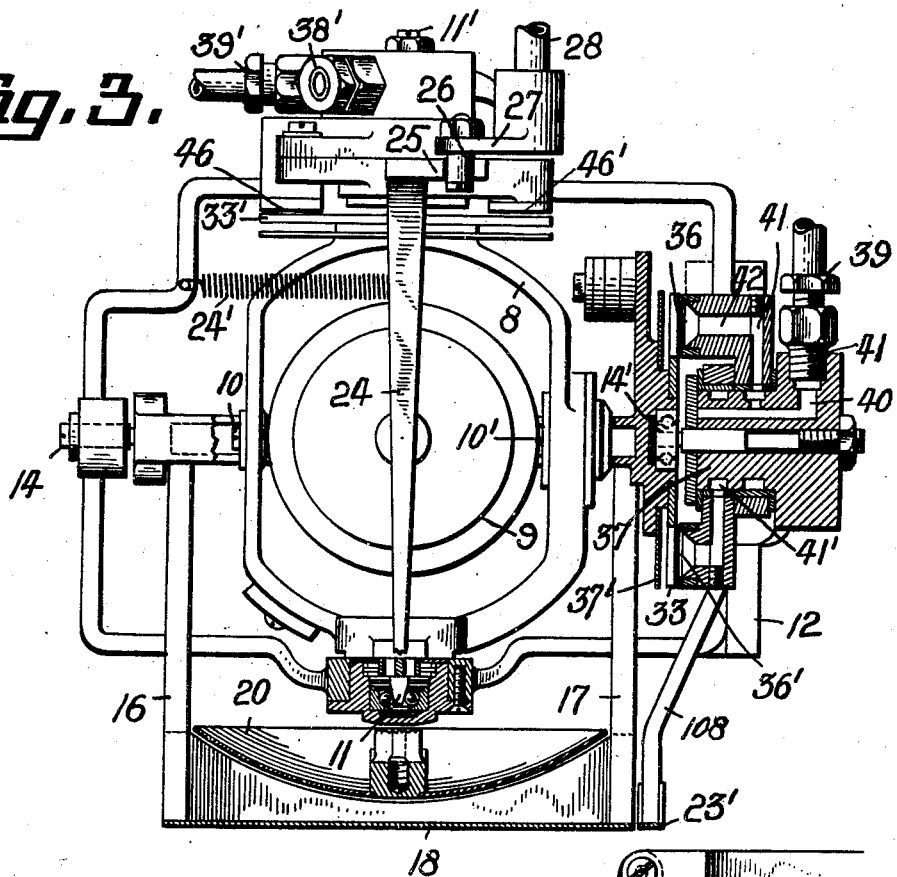
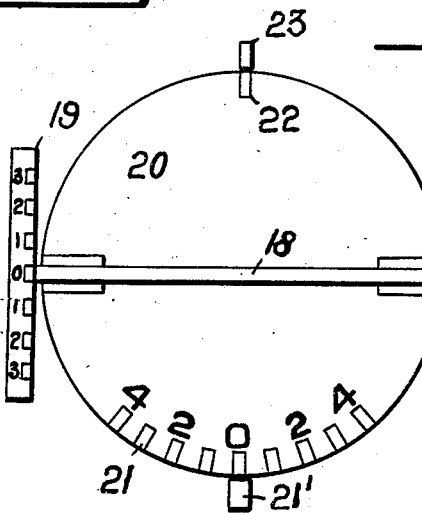
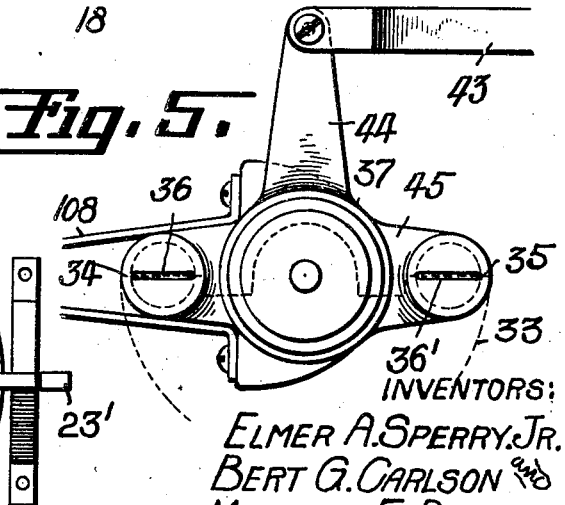

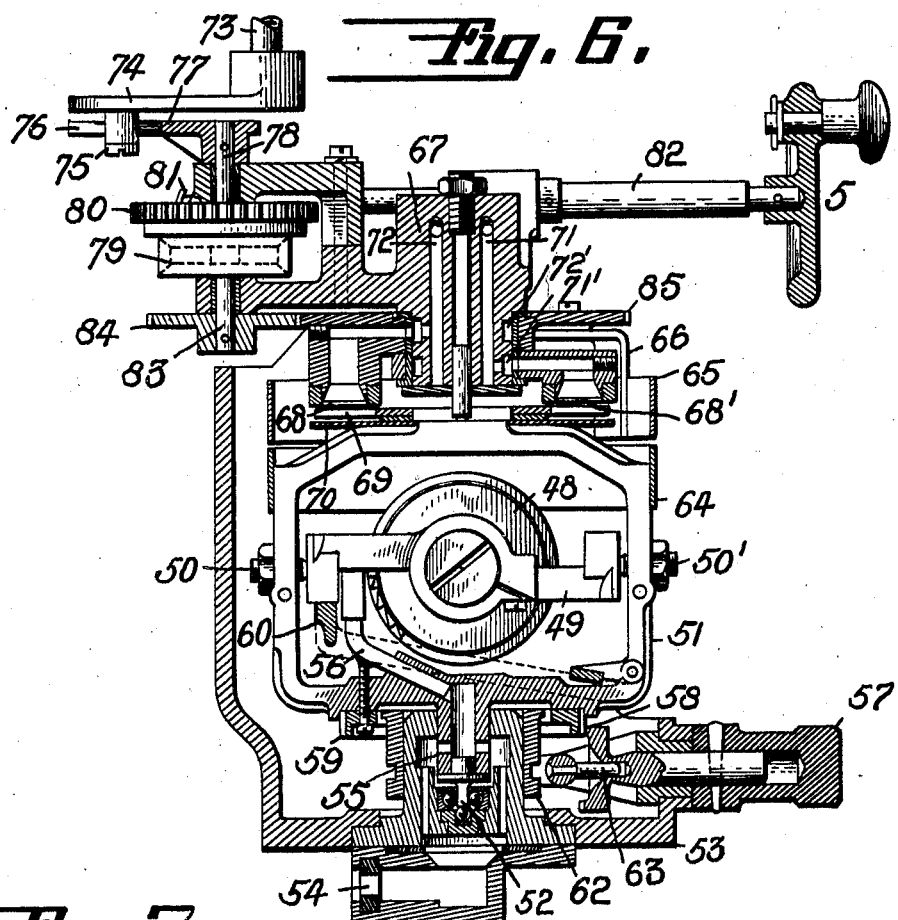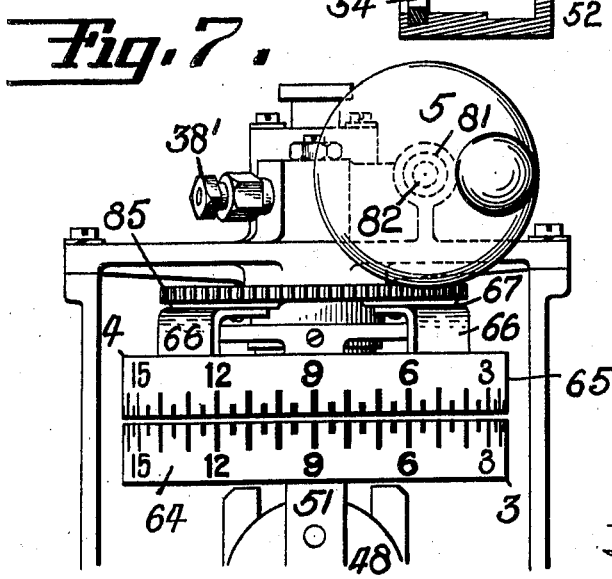

March 5, 1935. E. A. SPERRY, JR., ET AL 1,992,970
HYDROPNEUMATIC AUTOMATIC PILOT
Filed Sept. 2, 1932 7 Sheets-Sheet 4
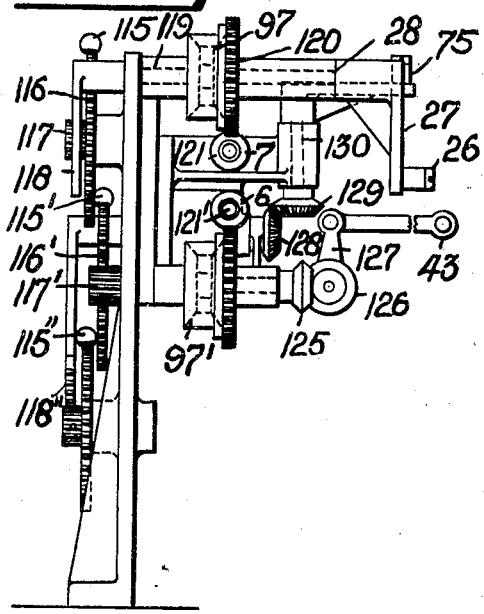
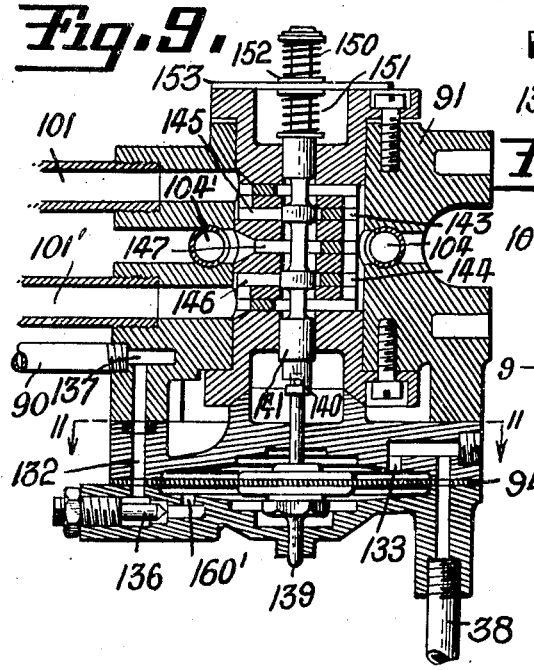
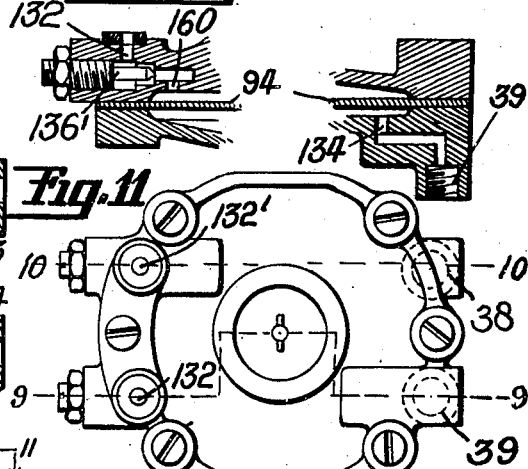
INVENTORS:
ELMER A. SPERRY, JR.
BERT G. CARLSON and
MORTIMER F. BATES.
BY
Herbert H. Thompson
their ATTORNEY.

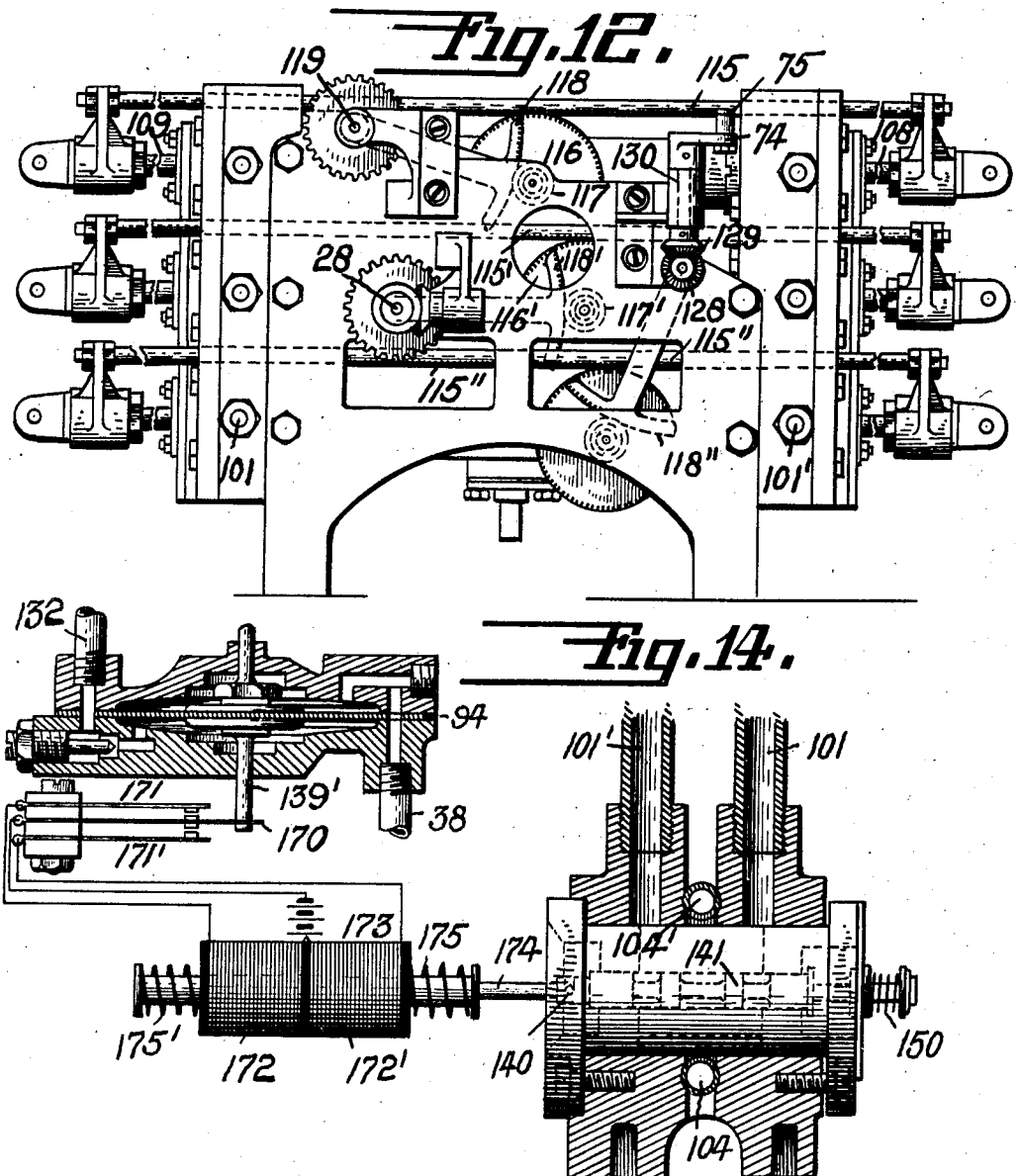

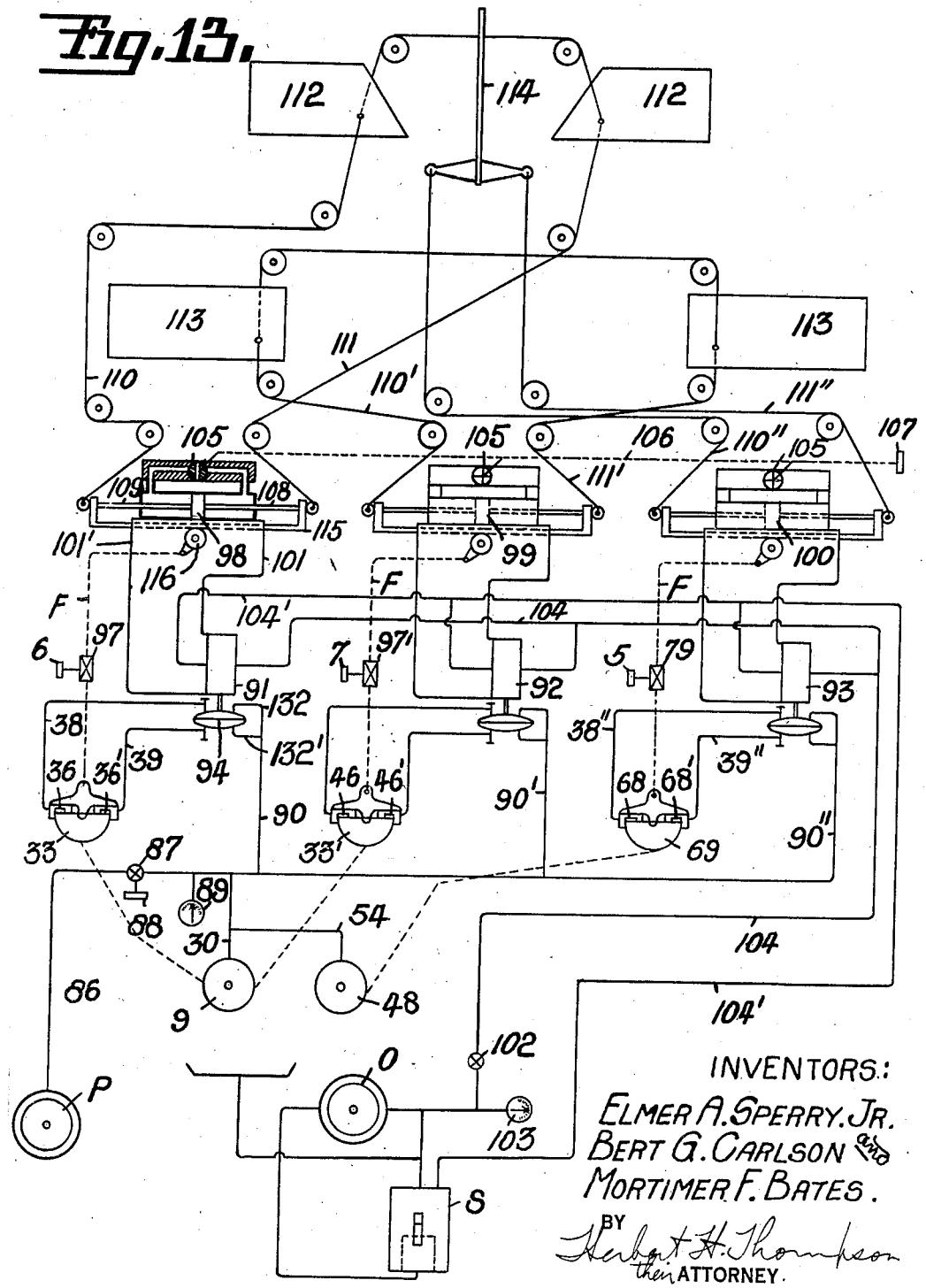

March 5, 1935.  E. A. SPERRY, JR., ET AL  1,992,970
HYDROPNEUMATIC AUTOMATIC PILOT
Filed Sept. 2, 1932  7 Sheets-Sheet 7
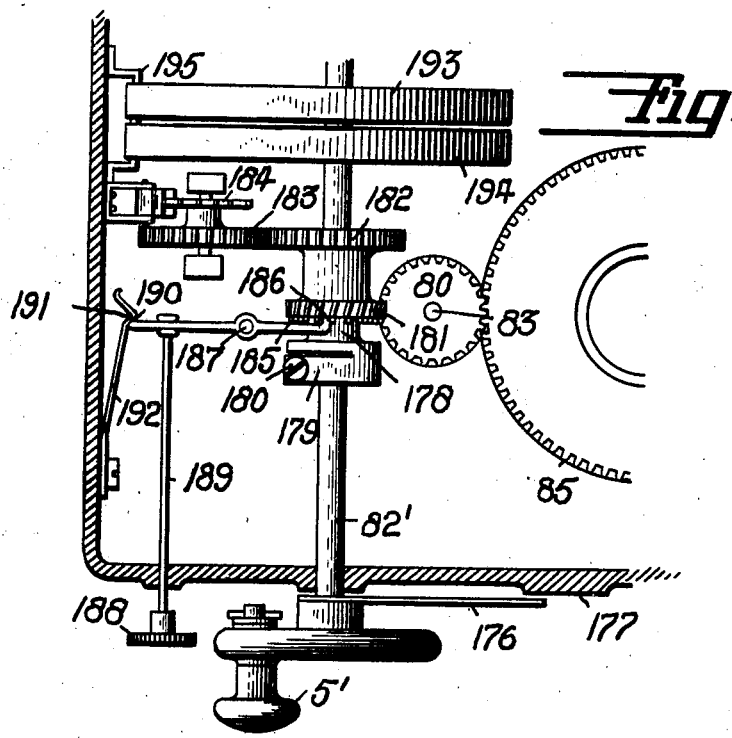
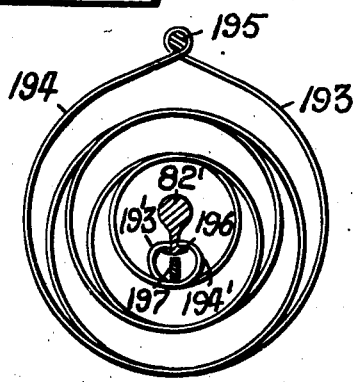
INVENTORS:
ELMER A. SPERRY, JR.
BERT G. CARLSON.
MORTIMER F. BATES.
BY Herbert H. Thompson
their ATTORNEY.

Patented Mar. 5, 1935

1,992,970

UNITED STATES PATENT OFFICE 1,992,970

HYDROPNEUMATIC AUTOMATIC PILOT

Elmer A. Sperry, Jr., Brooklyn, Bert G. Carlson, Queens Village, and Mortimer F. Bates, Brooklyn, N. Y., assignors to Sperry Gyroscope Company, Inc., Brooklyn, N. Y., a corporation of New York Application September 2, 1932, Serial No. 631,436

22 Claims. (Cl. 244—29)

This invention relates to automatic pilots for aircraft. The main purpose of the invention is to simplify and reduce the weight of such devices and to perform the various functions required for automatic steering without the use of electrical circuits and as smoothly as possible without hunting or jerking. According to the present invention, we prefer to employ to this end pneumatic controls from the gyroscopic instruments which, through differential air flow, govern hydraulic servo motors for moving the rudders of the plane. Preferably follow-up connections are employed from the servo motors to the controls to assure smooth proportional rudder control as distinct from the hard over control heretofore proposed in this connection. A further object of the invention is to so construct the automatic pilot that the gyroscopic elements thereof may be used as standard gyroscopic indicators on the aircraft, the gyroscope employed to maintain the course of the craft being adapted to also be used as the directional gyroscope on the plane for the guidance of the pilot, and the gyro-vertical used for stabilizing the plane, laterally and longitudinally, being also employed as the artificial horizon on the plane.

According to the drawings illustrating one preferred form of the invention,

Fig. 2—A is a detail thereof.

Fig. 3 is a plan view of the same, partly in section.

Fig. 4 is a face view of the artificial horizon.

Fig. 5 is a detail of the airports controlled by the gyroscope and used to actuate one of the servo motors.

Fig. 6 is a vertical section through the directional gyroscope.

Fig. 7 is a front view of the upper portion of the same.

Fig. 8 is an end view of the follow-up gearing connecting the servo motor and gyroscopes.

Fig. 9 is a vertical section through one of the relay valves controlled by the air pressure from the gyroscope and controlling in turn the oil flow to one of the servo motors, this section being taken on broken line 9—9 of Fig. 11.

Fig. 10 is a vertical section taken on line 10—10 of Fig. 11.

Fig. 11 is a horizontal section of the air-actuated portion of the valve taken approximately on line 11—11 of Fig. 9 between the upper and lower part of the valve.

Fig. 12 is a plan view of the three hydraulic servo motors showing in part the follow-up connections.

Fig. 13 is a diagram showing our complete automatic pilot system.

Fig. 14 is a sectional detail of a modified form of pneumatically controlled hydraulic valve.

Fig. 15 is a plan view partly in section of a modified form of course-change setting device.

Fig. 16 is a face view of two springs used in connection with the same.

Figure 1:
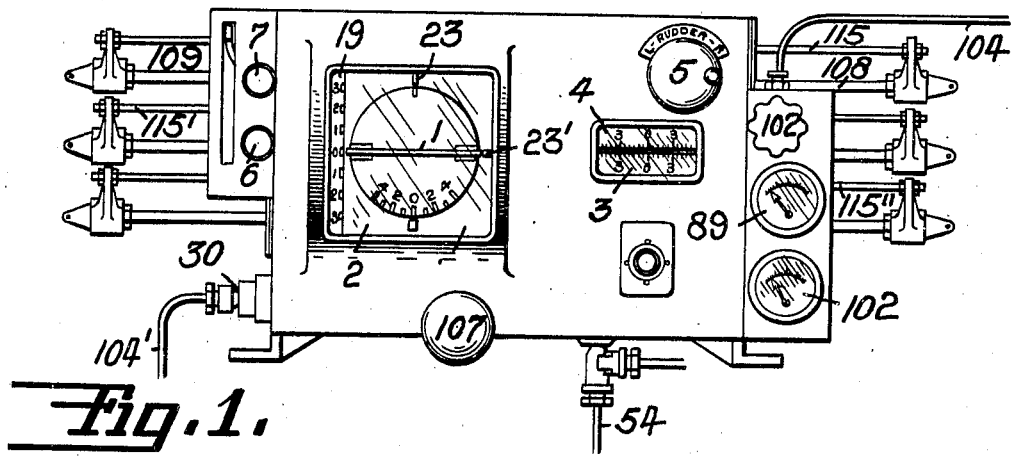
Fig. 1 is a face view of the major portion of an automatic pilot as it appears on the instrument board showing the artificial horizon and directional gyro units.
Figure 2:
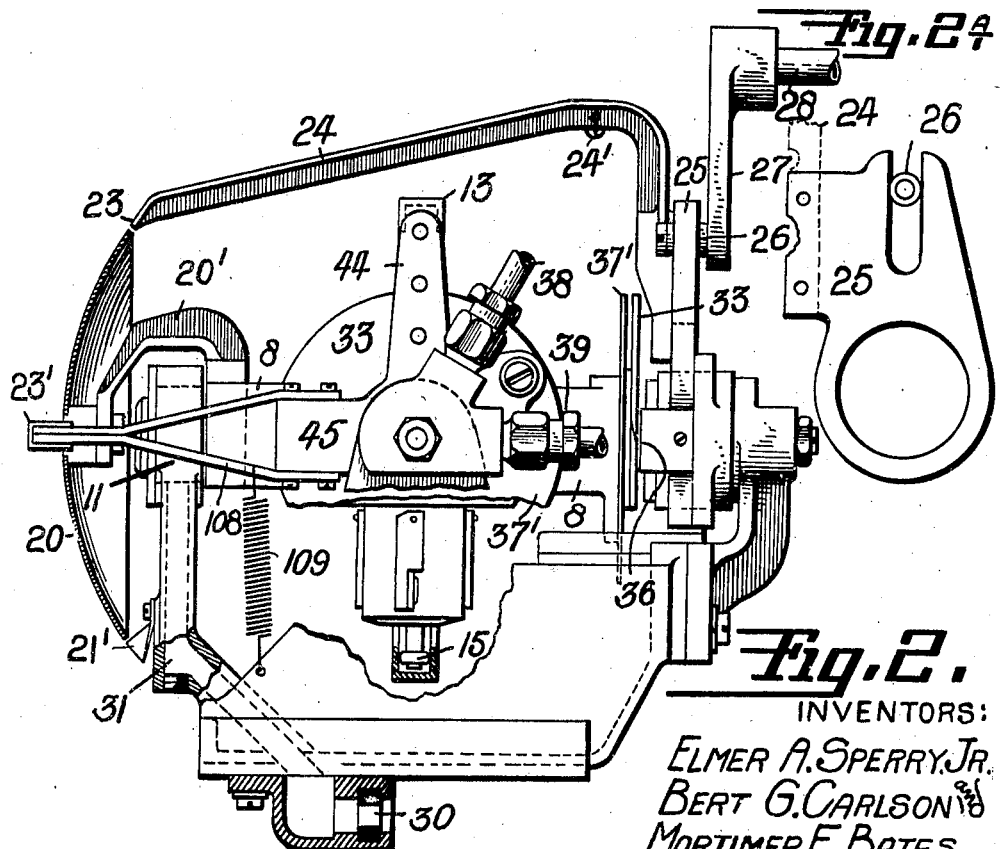
Fig. 2 is a side view, partly in section, of the gyro vertical or artificial horizon.

As above indicated, the entire automatic pilot is adapted to be mounted in back of the instrument panel on the craft so that the face thereof is visible as shown in Fig. 1 by which the two gyroscopes used for steering and stabilizing can also be observed visually by the operator so that they can be used as a directional gyroscope and artificial horizon respectively whether the automatic pilot is functioning or not. As shown, the artificial horizon bar 1 is visible through a window 2 in the face of the instrument, while the compass card 3 on the directional gyroscope is visible through a window 4. Preferably also on this face are manual means for controlling the craft through the automatic means. The steering of the craft in azimuth may be controlled through the handwheel 5, the diving and climbing through the thumb piece or knob 6, and the lateral control through the knob 7.

The gyro vertical or artificial horizon unit is shown in Figs. 2 to 5 inclusive. This unit may comprise an air spun gyro rotor (not shown) mounted for spinning on a vertical axis within rotor bearing casing 9, which in turn is pivoted on horizontal trunnions 10, 10' in gimbal ring 8. Said ring in turn is mounted for oscillation in horizontal pivots 11, 11' in the main frame 12. The air for spinning the rotor may be led in through a pipe connection 30 at the base of the gyroscope and up through the hollow support 31 and through the hollow trunnion 11 into a hollow portion of gimbal ring 8 and thence through the hollow bearing 10' into the gyro casing as shown more in detail in the copending application of one of the joint inventors, Bert G. Carlson, Serial No. 514,737, filed February 10, 1931, for Air driven gyro verticals.

In order to take off controls about both axes, there is shown a circular bail or loop 13 pivoted on trunnions 14, 14' in the framework 12, said trunnions being preferably normally in line with the trunnions 10, 10'. Said loop has a rolling contact with a roller 15 at the bottom of the gyroscope which is guided between U-shaped sides of the loop. The loop, therefore, partakes of the oscillation of the gyroscope about minor axis 10, 10' but not of its oscillation about its major axis 11, 11'. Secured to said loop by arms 16, 17 is the indicating bar 18 which acts as the climb and dive indicator for the craft and which may be read on graduations 19 at the side of the instrument.

A cup-shaped disc 20 is secured to an arm 20' rising from the gimbal ring 8 over the top of the front bearing 11. Said disc thereby tilts laterally with the gyroscope about its major axis and is shown as provided with annular indications 21 at its base which are read on the fixed index 21' to show the lateral attitude of the craft. There is also preferably provided on the disc an index 22 readable upon a movable follow-up index 23. The latter may be a part of a long pointer 24 which is secured at its rear end to a member 24 constituting a follow-up member from the servo motor and biased in one direction by spring 24'. By these indications, therefore, the pilot may observe whether the servo motors are properly functioning and said indexes also aid in initially setting the device in the proper relationship. Said follow-up member 25 is shown as having a U-shaped notch into which projects a pin 26 on an arm 27 actuated from a shaft 28 turned from the servo motor which controls the lateral stability of the craft.

On each axis of the gyroscope control means are provided for controlling the proper rudders in accordance with the attitude of the airplane. To this end the bail 13 has secured to one end thereof a shutter which may be in the form of a semi-circular disc 33 having horizontal knife edges 34, 35 at the top thereof which normally bisect elongated horizontal ports 36 and 36' mounted in a common frame 45 pivotally mounted on large bearing 37 on the fixed support 12. Behind said disc is placed a second disc or circular shield 37' adapted to prevent the escaping air from exerting torques on the gyroscope. Preferably the follow-up connection from the servo motor is effected by connecting the frame 45 to the servo motor so as to rotate the ports with respect to plate 33. This may be effected through a link 43 connected to an upstanding arm 44 from the frame 45 which carries the airports. A follow-up indicator 23' is mounted on a bracket 108 on frame 45 which is read in connection with bar 18, said bracket being biased by spring 109 to take up any lost motion in the follow-up connections. As shown, the air is led into the ports through two pipe couplings 38, 39, the latter leading through the channel 40 and through annular channel 41 into the channel 42 leading to the port 36. Pipe 38, on the other hand, leads into the annular channel 41' which communicates with the port 36'.

Similarly there is provided a semi-circular disc 33' secured to the gimbal 8 cooperating with similar airports 46 and 46' which may be constructed in a similar manner to the ports 36, 36' and are pivotally mounted on a fixed support and connected to the member 25 to provide a follow-up connection.

The directional gyroscope may likewise be constructed similar to a copending application of one of the joint inventors, Bert G. Carlson, Serial No. 608,189, filed April 29, 1932 for Directional gyroscopes. It is shown as an air spun rotor 48 journaled in a normally horizontal axis in rotor bearing frame 49 which is mounted for oscillation about a second horizontal axis 50, 50' in the vertical ring 51, the latter being journaled for rotation about the vertical axis 52 in the fixed frame 53. Air for spinning the gyroscope may be led in through pipe coupling 54 and passes up through the bearing 55 into the pipe 56 and on to the gyro wheel through air jets (not shown). A caging and resetting means similar to that shown in said prior application is preferably also provided, consisting of the setting knob 57, crowned gear 58 slidably and rotatably actuated therefrom, spur gear 59 on the base of the vertical ring, and locking arm 60 actuated from the yoke 62 and centralizing pin 63, so that the gyroscope may be locked about its horizontal axis in any position in azimuth, moved to any other desired position in azimuth and released with its spinning axis horizontal.

The vertical ring is shown as provided at its top with a circular graduated scale 64 which may be used as a compass to steer the craft. Just above said ring is shown a second graduated ring 65 which is secured to arms 66 on the rotatable framework 67 carrying the ports 68 and 68' by which the gyroscope controls the servo motor. To this end there is shown a semi-circular disc 69 similar to discs 33 and 46 and a shielding disc 70 below the same. Air is led into the ports from pipe couplings 38' in a manner similar to that described in connection with the gyro vertical and through axial channels 71, 72 which lead into annular channels 71', 72' connected respectively to ports 68' and 68. The follow-up connection in this case is introduced from the shaft 73 carrying an arm 74 having a pin 75 thereon engaging a U-shaped notch 76 in an arm 77. Said arm is shown as mounted on a shaft 78 which carries one arm of the differential gear train 79. The second arm of said train is constituted by the worm gear 80 which is turned from a wormwheel 81 on the shaft 82. On said shaft is mounted the handwheel 5 by which the course of the aircraft may be changed at will through the automatic pilot. The third arm of said gear train is connected to the shaft 83 having a gear 84 thereon meshing with a large gear 85 to which the air port frame is secured.

Having described the control elements of our invention, reference will now be had to the general diagram in Fig. 13 illustrating how the various rudders are controlled from the gyroscopes. It is obvious that either positive or negative air pressure may be employed for both spinning the gyroscopes and actuating the control elements. As shown an air pump P is employed from which air is led through the supply pipe 86 to a shut-off and reducing valve 87 by which the air pressure may be regulated by handwheel 88 until the gauge 89 reads proper working pressure. From thence air is led to the two gyroscopes 9 and 48 through pipes 30 and 54 to spin the rotors thereof. Air is also led through the pipes 90, 90' and 90'' to each side of each of diaphragms 94 in the three master control valves 91, 92 and 93, from which the air is led (in the case of valve 91, for instance) to port 36 and 36' on the gyro vertical through pipes 38, 39. Similarly each of the valves 92 and 93 are connected with the ports 46, 46' and 68, 68' on the gyro vertical and directional gyroscope, respectively. The follow-up connection in each case is represented by dotted lines F, each of which is connected to the framework carrying the ports through a differential connection (97, 97' and 79) by which the manual control through a hand means 5, 6 and 7 is effected.

Each diaphragm 94 controls a master hydraulic valve (91, 92 and 93) described in detail hereinafter for directing the oil or other liquid to one side or the other of one of three hydraulic pistons 98, 99 and 100 through pipes 101, 101'. The oil pressure is supplied by an oil pump O which pumps oil from the sump S through the shut-off and regulating valve 102 by which the oil may be either shut off or its rate of flow regulated so that the speed of operation of the servo motor pistons may be adjusted as desired. The oil supply passes up through the pipe 104 and into each cylinder valve 91, 92 and 93 with a common return 104' leading back to the sump S. From the valves the oil passes to the hydraulic cylinders through one or the other of pipes 101 or 101' and back through the other. Each cylinder may be provided with a rotary by-pass valve 105 by which the servo motor system may be paralyzed and hand control used at will. Preferably all said valves are actuated from a common push rod 106 and handle 107 so that all servo motors may be rendered operative or inoperative simultaneously. Each piston has piston rods 108, 109 extending in opposite directions from the cylinder to which are attached at the outer ends thereof wires or cables 110, 111 leading to the control surfaces. As shown, the cables 110, 111 actuate the elevators 112 while cables 110', 111' actuate the ailerons 113, and cables 110'', 111'' the vertical rudder 114.

Each piston rod also has attached thereto a bar 115 which extends outside of the cylinder and has rack teeth cut thereon. The rack teeth of the upper bar 115 mesh with a gear 116 (see Figs. 8 and 12) on the shaft of which is a pinion 117. Said pinion meshes with a gear sector 118 mounted on a shaft 119. Said shaft acts as one arm of differential 97, the second arm being in the form of a worm gear 120 actuated from a worm 121 which in turn may be turned from the adjusting knob 7 on the face of the instrument by which adjustment of the ailerons may be effected. The third arm of said train turns the shaft 28 having the arm 27 thereon carrying the pin 26 above described. Similarly the bar 115' of the cylinder 99 has rack teeth which mesh with gear 116' on the shaft of which is pinion 117' meshing with a gear sector 118' (Fig. 12). Said sector operates through a similar differential gear train 97', one arm of which is turned from the worm 121', which in turn may be turned from the knob 6 (Fig. 1) by which the elevators are adjusted. The third arm of said train turns the bevel gear 125 meshing with bevel gear 126 which turns the crank 127 to move the link 43 connected to the gyro as shown in Fig. 5. The third bar 115'' turns through similar gearing a gear sector 118'' on the shaft of which is a bevel gear 128 meshing with a bevel gear 129 on vertical shaft 130. On said shaft is mounted an arm 74 carrying pin 75 as shown in Fig. 6, thereby forming a follow-up connection to the azimuth gyroscope.

The details of the preferred form of pneumatically controlled hydraulic valve 91—93 for the servo motors are shown in Figs. 9 to 11. The air from the supply pipe 90 is brought in through common passage 137 connecting with vertical holes 132 and 132', the former leading to the top side of the flexible air tight disc or diaphragm 94 through port 160 (Fig. 10), and the latter leading to the bottom side of the same through port 160' (Fig. 9). Adjustable needle valves 136, 136' may be provided in each passage to equalize the rate of flow of air on each side of the diaphragm. Outlet ports 133 and 134 are also provided, the former leading from a point above the diaphragm through pipe 38 to port 36 on the gyroscope and the latter leading from a point below the diaphragm through pipe 39 to port 36' on the gyroscope. Valves 92 and 93 may be in all respects like valve 91 in the details of construction and are similarly connected to the proper ports on the gyroscopes as shown in Fig. 13. It will be evident, therefore, that with the valve properly adjusted that the pressure on the sides of the diaphragm 94 will be equal as long as the knife edges bisect the ports, but in case of relative tilting of the gyroscope in an airplane this equilibrium will be disturbed and air will be drained faster from one side of the diaphragm than the other, thus causing a movement of the diaphragm up or down as the case may be.

Said diaphragm has connected to its center a piston rod 139 coupled at 140 to a cylinder valve 141. Oil is led into said valve through intake pipe 104 and from thence flows through passage 143 to each end of the chamber 144. Said chamber has three ports, 145 leading to the upper outlet pipe 101, 146 leading to the lower outlet pipe 101', and the central opening 147 leading to the common return pipe 104'. With the piston valve in a position shown in the drawings, all the ports are closed. If the valve is moved upwardly, the lower port 146 is placed in communication with the intake while the upper port 145 is placed in communication with the outlet, thus causing oil to flow through the pipe 101' to the piston 98 and back through the pipe 101 thereby moving the piston to the right in Fig. 13. If the valve is moved downwardly, the reverse happens. Said valve is normally centralized by a pair of compression springs 150, 151 mounted on an extension of the valve. Each spring bears at its center against a washer 152 which normally rests against a central collar (not shown) on the extension and also against a fixed plate 153. It will be evident, therefore, that movement of the valve in either direction will be opposed by said springs and the valve maintained in its centralized position.

The operation of our invention is briefly as follows: It will be understood that the automatic pilot may either be used on an airplane as the sole control means or as an adjunct to the usual manual controls. In the latter case, the aviator may instantly take over the controls from the automatic pilot by pushing in on the knob 107 thereby opening the by-pass valves 105 so that the controls may be moved manually by the usual control levers (not shown), the pistons not offering any resistance thereto by reason of the by-pass valves being open. The aviator may then steer from the artificial horizon and directional gyroscope in the usual manner. To cut in the automatic control, the knob 107 is pulled the other way rendering the system operative, assuming the air and oil pumps to be working and the pressures properly adjusted through the valves 87 and 102. The airplane will then be maintained on its set course through the functioning of the airports 68, 68' on the directional gyroscope and lateral and longitudinal stability will be maintained through the ports 36, 36' and 46, 46' on the gyro vertical. If a change of course is desired, the aviator adjusts the handwheel 5 to turn the upper card 4 to the new course desired whereupon the automatic pilot will bring the plane around until the two cards 3 and 4 again match. This operation will take place smoothly by reason of the follow-up system and the non-hunting, pneumatic hydraulic controls. Similarly, climbing or diving of the plane may be caused by adjusting the knob 6 which operates through differential 97 to adjust the follow-up connection to the ports 36, 36' and the lateral stability may be adjusted similarly through the knob 7.

Instead of operating the hydraulic control valves by direct connection with the pneumatically controlled diaphragm 94, it is obvious that a relay may be interposed between the two to insure positive action. One form of electrical relay is shown in Fig. 14. In this figure the valve stem 139' of diaphragm 94 is shown as connected to the spring contact arm 170 adapted to contact with upper or lower contacts 171, 171' in circuit, respectively, with opposed windings 172, 172' of spring centralized solenoid 173. Stem 174 of said solenoid is connected through the joint 140 to a valve 141 which may be constructed as in Fig. 9. By this means the valve will be always held in one of three definite positions, i. e., full-on in one direction, completely off, or full-on in the other direction, since the solenoid is normally centralized by compression springs 175, 175', thereby insuring positive action of the servo motor although not as smooth as the direct coupled valve of Fig. 9.

We may also provide a means for setting any predetermined course change into the pilot and then causing the craft to turn to its new course at a predetermined rate. Such a means may assume the form shown in Figs. 15 and 16 in which the course-changing handle 5' is mounted on a shaft 82' and has an index pointer 176 thereon readable on a graduated surface 177. Shaft 82' has frictionally mounted thereon a sleeve 178 which may have an adjustable friction clamp thereon consisting of split ears 179 connected by set screw 180. On said sleeve is mounted a spiral gear 181 meshing with a second spiral gear 80 on shaft 83 as in Fig. 6, said shaft carrying a gear (not shown) meshing with the large gear 85 on the gyroscope. Said sleeve is also provided with a spur gear 182 meshing with a gear 183 of a constant speed escapement or clockwork mechanism 184. There is also shown on the face of the gear 181 teeth 185 with which a pivoted finger 186 engages to hold the sleeve fixed as long as said finger is in engagement with said teeth. Said finger is shown as pivoted at 187 and may be released by pushing in on push button 188 on shaft 189. This raises the finger out of the notch between the teeth and pushes the outer end 190 of arm 186 past the hump 191 on the spring finger 192, thus holding the finger out until pulled in again by pulling on button 188. There is also connected to the shaft 82' a pair of oppositely wound spiral springs 193 and 194. Each of said springs is wound at its outer end around a fixed pin 195 and at its inner end engages on opposite sides a projection 196 on the shaft 82'. If the shaft 82' is turned clockwise in Fig. 16, for example, the hooked end 193' of spring 193 will be wound up while the spring 194 will be left behind with its hooked end 194' against the fixed pin 197. On the other hand, if the handle is turned in the opposite direction, the other spring will be wound up.

The operation of this modification is as follows: If it is desired to change course through a predetermined number of degrees, the handle 5' is turned when the finger 186 is in engagement with said teeth until the pointer 176 reads the degree of turn desired. This action will have no direct effect on the aircraft since gear 80 will not be turned because the gear 181 is locked and the shaft 82' slips around within the sleeve. The handle 5' is then released and the button 188 pushed inwardly. The spring then will turn the shaft 82 back slowly taking the sleeve 178 with it by reason of the frictional connection, but the speed of movement of the sleeve will be limited by the clockwork mechanism. This action will continue until the spring has completely unwound the shaft 82' and returned the pointer to its original position, at the same time displacing the air ports 68 and 68' through the desired angle. The clockwork mechanism is so adjusted that the air ports on the gyroscope will be turned at a known rate (not faster than the plane can follow).

Such a mechanism has special advantages in blind flying and especially in blind landings with the aid of radio communication and radio beams. By means of the radio beam the aviator may guide his plane until it is over the landing field. The ground crew can readily determine the location of the plane and its direction by radio communication and signal the aviator exactly what course to take, i. e., what turn to make, after he passes over the radio beam sending station, provided the ground crew knows what rate of turn the aviator will make. With our device, the rate of turn may be predetermined and known. Therefore, as soon as the aviator is informed of the desired degree of turn, he sets his handle 5' until indicator 176 shows the proper turn. He does not release lock 186, however, until he reaches the cone of silence, whereupon he presses in on the handle 188, automatically makes his turn, and cuts his engine, the ship being automatically directed to the landing field in the proper relation with respect to the wind which, of course, is known to the ground crew.

In accordance with the provisions of the patent statutes, we have herein described the principle and operation of our invention, together with the apparatus which we now consider to represent the best embodiment thereof, but we desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described our invention, what we claim and desire to secure by Letters Patent is:

1. In an automatic steering device for aircraft, a directional gyroscope, a plurality of rotatably mounted air ports adjacent thereto and on opposite sides thereof, a semi-circular disc on the gyroscope and rotated therewith in a plane at right angles to said ports and adapted to alter the relative coverage of said ports on relative change in the azimuthal position of said gyroscope and the aircraft, a servo motor actuated from the differential air pressure created by said ports, a follow-up connection from said motor to turn said ports with the movements of the motor, and means settable at will also for rotating said ports to alter the position of the craft with respect to the gyroscope whereby the course may be changed.

2. In an automatic pilot for aircraft, the combination with a gyroscope, of differential air flow means actuated by relative turning of the craft and gyroscope, a hydraulic servo motor system for turning the rudder, and a pneumatically-operated hydraulic valve operated from the differential air pressure created by said means for controlling said servo motor.

3. In an automatic pilot for aircraft, the combination with a gyroscope, of differential air flow means actuated by relative turning of the craft and gyroscope, a hydraulic servo motor system for turning the rudder, a pneumatically-operated hydraulic valve operated from the differential air pressure created by said means for controlling said servo motor, and means operable at will for bypassing said servo motor whereby the rudder may be turned manually without interference from the hydraulic system.

4. In an automatic pilot for aircraft, the combination with a gyroscope, of differential air flow means actuated by relative turning of the craft and gyroscope, a hydraulic servo motor system for turning the rudder, a follow back connection from said motor to said means, and a pneumatically operated hydraulic valve operated from the differential air pressure created by said means for controlling said servo motor.

5. In an automatic pilot for aircraft, a stabilizing gyroscope, pitch and tilt indicating members secured thereto and actuated therefrom, means controlled from said gyroscope for controlling the aircraft laterally and longitudinally, follow-up connections from each of said means to said gyroscope, a vertically movable indicator adjacent said pitch indicating member and actuated from the longitudinal control follow-up means, and a second angularly movable indicator adjacent said tilt indicating member and actuated from the lateral control follow-up means.

6. In a control system for aircraft, a hydraulic pressure source, means connected with said source for actuating a control surface, a source of air pressure, means connected with said air pressure source for controlling said actuating means responsive to pressure changes, a gyroscope for differentially effecting pressure changes in said latter means, and means for altering the relation between the gyroscope and pressure source for effecting changes in course through the gyroscope.

7. In an automatic control system for aircraft, the combination with a gyroscope, of means for automatically controlling a control surface therefrom comprising a hydraulic pressure source, means for actuating said surface connected with said source, a valve for controlling the connection between said source and said surface actuating means, a source of air pressure, a differential air pressure diaphragm for controlling said valve, differential air flow ports connected with said diaphragm and actuated by said gyroscope whereby differential pressure changes are effected on the two sides of said diaphragm, and follow-back means to said ports controlled by said surface.

8. In an automatic pilot for aircraft, a directional gyroscope adapted to be mounted on the instrument panel of the craft, a direction indicator mounted thereon and visible to the aviator, means controlled from the gyroscope for steering the craft, a follow-up connection from said means to the gyroscope, and a second indicator mounted adjacent said direction indicator and actuated from said follow-up connection.

9. In an automatic pilot for aircraft having a substantially vertical instrument panel, a gyroscope for governing the lateral and longitudinal stability of the craft, a second gyroscope for governing the course, indicators of the lateral and longitudinal attitude of the craft and of the course on said gyroscopes, and means for mounting said gyroscopes on said instrument panel so that said indicators are visible from the pilot's seat and may be used as visual directional and horizon indicators as well as using the gyroscopes as base lines for automatic steering.

10. In a gyroscopic control apparatus, the combination with a gyroscope, a pair of air ports mounted adjacent thereto, pivot means for rotatably mounting the same, a lead-out pipe for each port, separate channels through said pivot connecting each port with its respective pipe, an intercepting plate on the gyroscope adjacent said ports, a servo motor actuated from the differential air pressure in said pipes, and a follow-back connection to said pivoted air ports to turn the same.

11. In a gyroscopic control apparatus, the combination with a gyroscope, a pair of air ports mounted adjacent thereto and adapted to project parallel air streams in the same direction, pivot means for rotatably mounting the same, a lead-out pipe for each port, an intercepting plate on the gyroscope adjacent but out of contact with said ports and rotatable in a plane at right angles to said air streams, a servo motor actuated from the differential air pressure in said pipes, and a follow-back connection to said pivoted air ports to turn the same.

12. In an automatic pilot, a course-changing means comprising a setting handle, a directional instrument, shifting means thereon for changing course, spring means adapted to be placed under tension by the turning of said handle, means for preventing the operation of said shifting means while said handle is being turned, and constant speed mechanism for limiting the rate of turning of said shifting means by said spring means.

13. In an automatic pilot, a course-changing means comprising a setting handle, a directional instrument, shifting means thereon for changing course, and means for limiting the rate at which said shifting means may be turned from said handle.

14. In an automatic pilot, a course-changing means comprising a setting handle, a directional instrument, shifting means thereon for changing course, a turn indicator operated by said handle, and delayed action means for changing course at a predetermined rate energized by said handle.

15. In an automatic pilot, a course-changing means comprising a setting handle, a directional instrument, shifting means thereon for changing course, a turn indicator operated by said handle, a lock for preventing operation of said shifting means until released, spring means energized by said handle for operating said shifting means when released, and constant speed mechanism for fixing the rate of turn of said shifting means by said spring.

16. In an automatic steering device for aircraft, a gyroscope mounted for freedom about two axes, a pair of air ports rotatably mounted about one of said axes adjacent but out of contact with said gyroscope and adapted to project parallel air streams in the same direction, a disc on the gyroscope turnable therewith about said axis and normally partially covering to the same extent said air ports, a servo motor actuated from the differential air pressure created by said ports, and a follow-up connection from said motor to turn said ports with and in proportion to the movements of the motor.

17. In an automatic steering device for aircraft, a gyroscope mounted for freedom about two axes, a pair of air ports rotatably mounted about one of said axes adjacent but out of contact with said gyroscope and adapted to project parallel air streams in the same direction, a disc on the gyroscope turnable therewith about said axis and normally partially covering to the same extent said air ports, a servo motor actuated from the differential air pressure created by variation in the coverage of said ports, and means for adjustably rotating said ports at will to alter the position of the craft with respect to the gyroscope.

18. In a gyroscopic control apparatus, the combination with a gyroscope, a pair of air ports mounted adjacent thereto and adapted to project parallel air streams in the same direction, pivot means for rotatably mounting said ports, a lead-out pipe for each port, separate channels through said pivot connecting each port with its respective pipe, an intercepting plate on the gyroscope adjacent said ports and movable at right angles to said air streams, a servo motor actuated from the differential air pressure in said pipes, and a followback connection to said pivoted air ports to turn the same.

19. In a pneumatic automatic pilot for aircraft, the combination with a gyroscope pivoted about fore and aft and lateral axes, a casing therefor, two pairs of air ports about both of said axes, means for maintaining a pressure thereto superior to that of that within said casing, means for differentially closing said ports by inclination of the aircraft about either axis, and servo motors for the elevators and ailerons controlled by the differential pressure created by the variable air flow through said ports.

20. In a pneumatic automatic pilot for aircraft, the combination with a horizon gyroscope pivoted about fore and aft and lateral axes and a directional gyroscope rotatably mounted about a vertical axis, a casing for both gyroscopes, a pair of differential air ports about each axis of said horizon gyroscope and about the vertical axis of the directional gyroscope and adapted to be connected to a source of pressure higher than that within said casing, means on each gyroscope for differentially interrupting the air flow from said ports on inclination of the aircraft about either horizontal axis or by turning thereof, and servo motors for the elevator, ailerons and rudder controlled by the differential pressure created by the variable air flow through said ports.

21. In an automatic pilot for aircraft having a substantially vertical instrument panel, a gyroscope for governing the lateral and longitudinal stability of the craft, a second gyroscope for governing the course, indicators of the lateral and longitudinal attitude of the craft and of the course on said gyroscopes, means for mounting said gyroscopes on said instrument panel so that said indicators are visible from the pilot's seat and may be used as visual directional and horizon indicators as well as using the gyroscope as base lines for automatic steering, auxiliary indicators adjacent said first mentioned indicators for showing the movements of the rudders, and follow-up means connecting said auxiliary indicators and the respective rudders.

22. In an automatic pilot for aircraft having a substantially vertical instrument panel, a gyroscope for governing the lateral and longitudinal stability of the craft, indicators of the lateral and longitudinal attitude of the craft on said gyroscope and lying in substantially the same vertical plane in front of the gyroscope, and means for mounting said gyroscope on said instrument panel so that said indicators only are visible from the pilot's seat and may be used as visual horizon indicators as well as using the gyroscope as a base for automatic steering.

ELMER A. SPERRY, Jr.
BERT G. CARLSON.
MORTIMER F. BATES.